Sept. 15, 1970 A. PEITZ 3,529,077

TELECOMMUNICATIONS EXCHANGE SYSTEMS

Filed June 1, 1967 3 Sheets-Sheet 2

United States Patent Office 3,529,077

Patented Sept. 15, 1970

3,529,077

TELECOMMUNICATIONS EXCHANGE SYSTEMS

Albert Peitz, 28 Preysingstrasse, 8 Munich 8, Germany

Filed June 1, 1967, Ser. No. 642,889
Claims priority, application Germany, June 3, 1966, S 104,131
Int. Cl. H04l 11/00
U.S. Cl. 178—3 4 Claims

ABSTRACT OF THE DISCLOSURE

A system to determine the release supervision time for long distance transmission in centrally controlled teleprinter dial exchange installations wherein the outgoing trunk-line circuits associated with a connection are successively made available and a busy signal is produced only after the seizure of all lines. A group of trunk-line circuits are arranged to be successively seized, and means are provided for delaying renewed seizure of any trunk-line circuit in said group which are operative only after seizure of all trunk-lines of the group and even if any of the seized trunk-lines of the group becomes free.

Figure 1A:
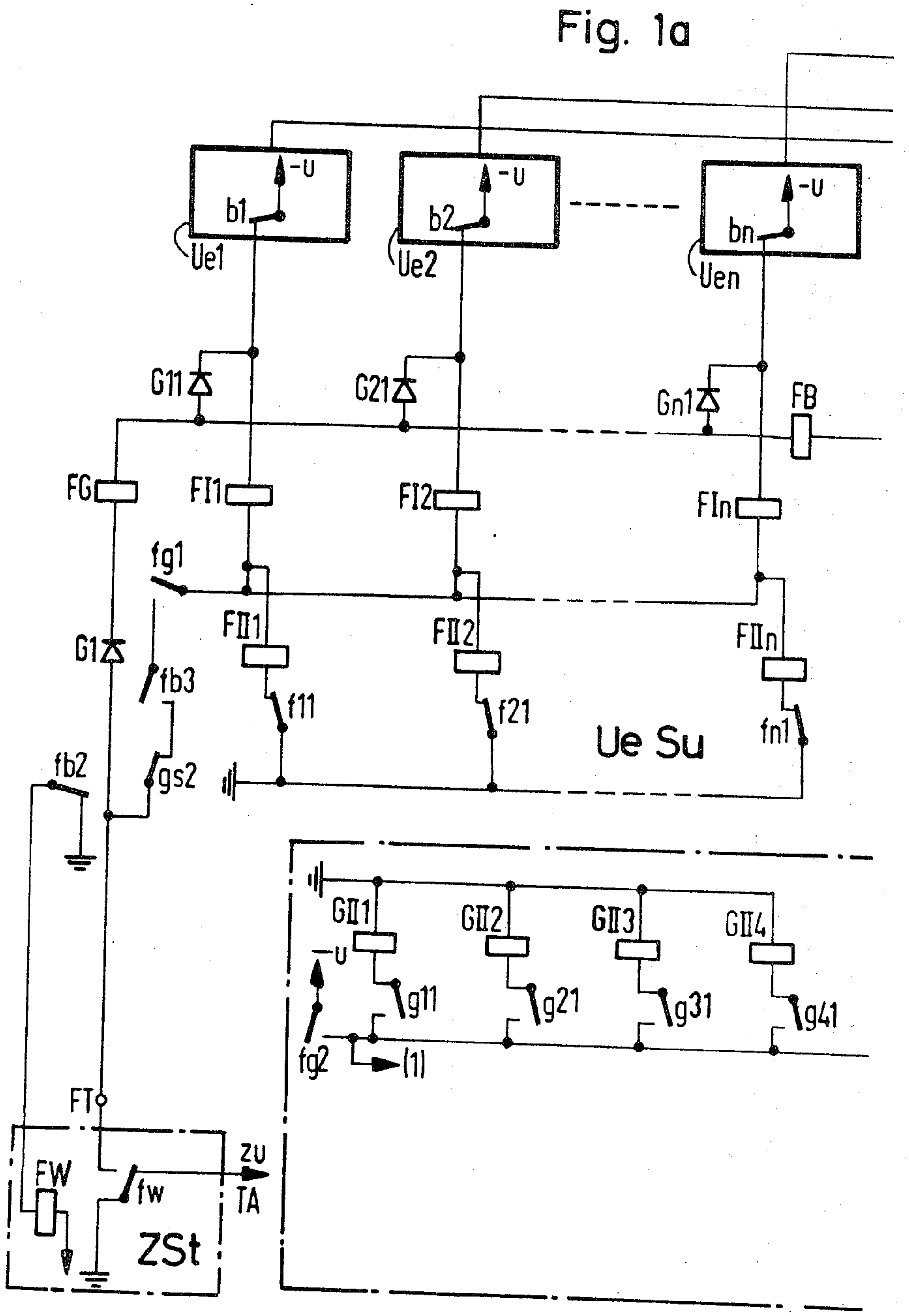

This invention relates to telecommunications exchange systems, particularly dial-operated teleprinter exchange systems.

In the transmission of teleprinter information through trunk-lines, it is necessary, at the terminal points of a given trunk-line, to seize trunk-line circuits. These line circuits convert the information in both directions, in accordance with the conditions under which the teleprinter channel is operating. As a general rule, the line circuits are provided with devices which, at the time of seizing, check that the trunk-line is in a suitable state. This seizing criterion initiates transmission of a backward pulse to the line circuit of the station at the other end, and provided that this pulse arrives within a specific time further development of the connection is initiated. If, at the end of information transmission, the connection is terminated either by the receiving or by the transmitting subscriber, then a breakdown criterion is produced. By means of this criterion, both the outgoing line circuit to which the calling subscriber is connected, and the incoming line circuit to which the called subscriber is connected, are cleared. However, whereas with clearing of the line circuit seized in the outgoing direction there is a breakdown criterion available indicating that the line circuit has in fact been so cleared, the breakdown criterion relating to the line circuit seized in the incoming direction is not signalled back to the other end. In the case of the line circuit seized in the outgoing direction, therefore, there is no certain criterion of whether the line circuit seized in the incoming direction at the other end is free again, or when it will be free. For this reason, it is necessary to provide for a so-called "breakdown monitoring time." During this time, which must make allowance for all the worst possible conditions, a previously seized line circuit cannot be seized again because of the possibility that the line circuit at the other end is not yet ready to receive information.

In known systems, the devices for monitoring breakdown in outgoing or two-way operated trunk-line circuits are often provided individually for each such line circuit. This means that for each trunk-line circuit devices have to be provided which will prevent premature seizure. It is known in this context to interrupt the outgoing seizing circuits of a trunk-line circuit after transmission of the end-of-message signal, for the period of the breakdown monitoring time, and this is generally effected by a delayed break relay associated with a capacitor.

Recently, centrally operated exchange systems have become known in which the entire development of a connection is effected via a central control device. In centrally controlled exchange systems of this sort, selection of an outgoing trunk-line circuit is no longer effected, as before, by a free selection of a free line in a line group, but instead of seizing of a line circuit in the outgoing direction is effected in accordance with a predetermined system of allotment. The free lines in a group are successively prepared to handle outgoing calls. Only after the last trunk-line circuit of a line group has been seized are all the line circuits which have meanwhile become free, prepared to handle outgoing calls.

The present invention specifically relates to a dial-operated teleprinter exchange system of this sort.

According to the present invention there is provided a telecommunications exchange system including a group of trunk-line circuits arranged to be successively seized, and means for delaying renewed seizure of any trunk-line circuits in said group for a specific time, said means becoming operative only after seizure of all the trunk-line circuits in said group.

Figure 1B:
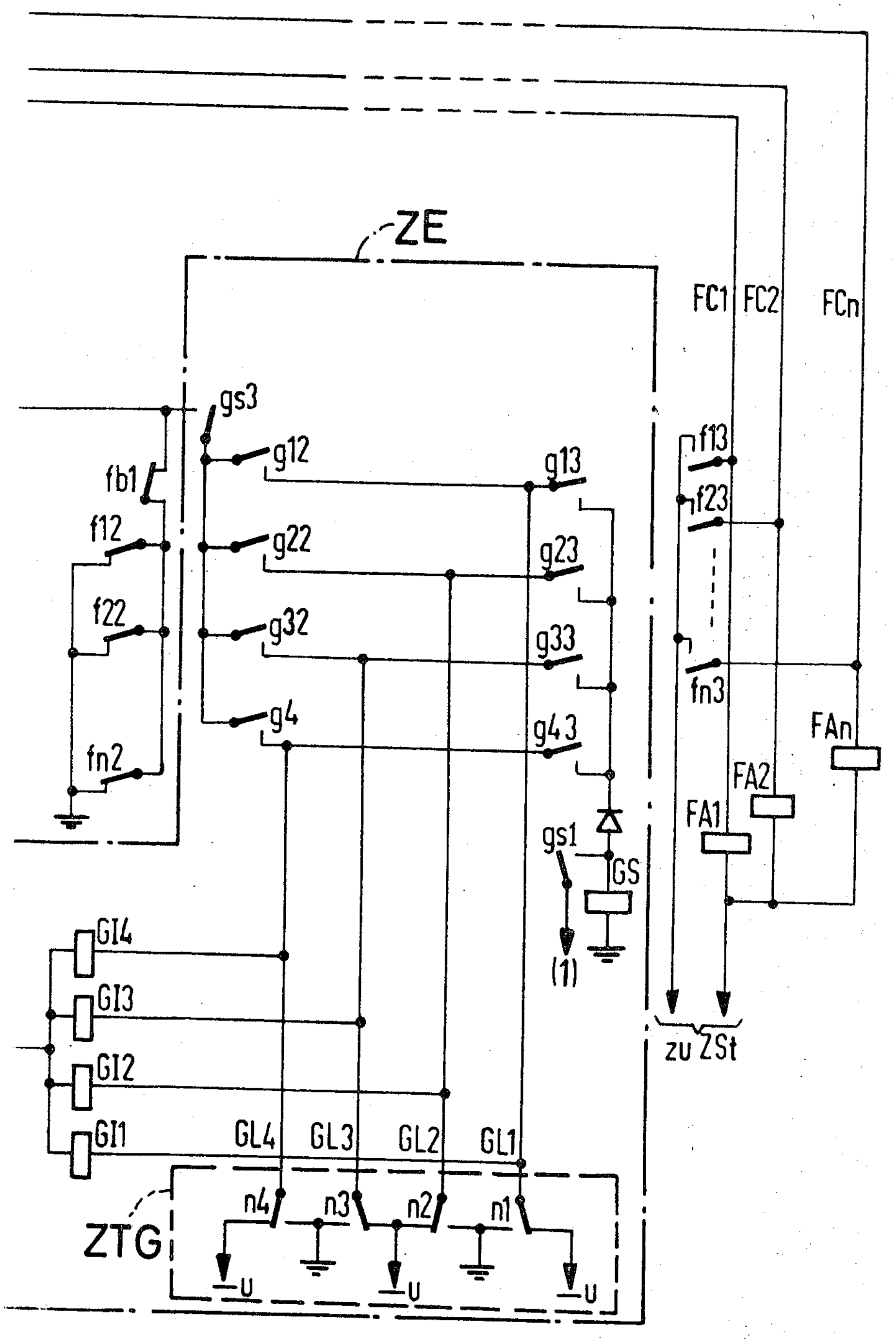
Figure 2:
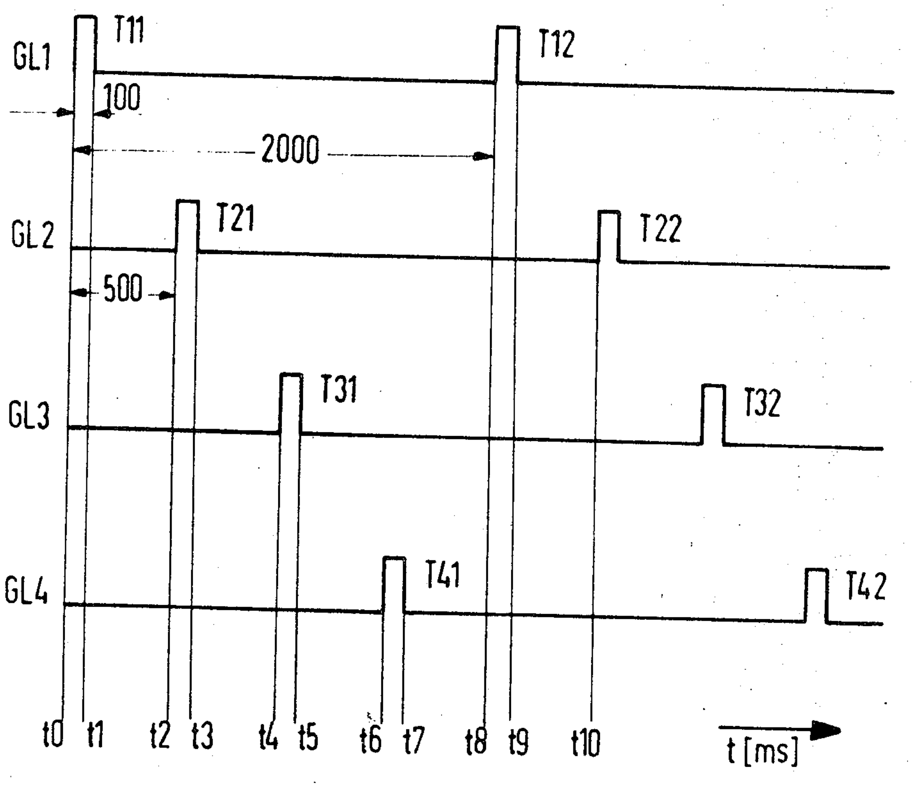

One embodiment of an exchange system in accordance with the present invention will now be described by way of example with reference to the accompanying drawings in which:

FIG. 1 comprised of FIGS. 1*a* and 1*b*, is a block diagram of part thereof, and FIG. 2 is a diagram illustrating operation of the system.

Referring to FIG. 1, this shows trunk-line circuits U*e*1 to U*en* associated with a single trunk-line group, a central control device ZS*t*, and a finder device U*e*–S*u*. It is assumed that the central control device ZS*t* executes all the operations relating to the handling of connections, and monitors them. In the case of a demand for a connection from a subscriber, the central control device ZS*t* connects itself to the calling subscriber circuit and to a free line circuit. The calling subscriber circuit is connected via a routing network (not shown) to the selected free line circuit, in accordance with the prevailing traffic conditions. The finder device U*e*–S*u*, via which the central control devices ZS*t* is connected to the line circuit, also allots the trunk-line circuits for outgoing connections.

The system also includes a device ZE for determining the breakdown monitoring time. The device ZE includes pulse generator ZTG and a series of relays G1 to G4 and GS.

It will be assumed that all the line circuits U*e*1 to U*en* are free and that therefore all seizing contacts *b*1 to *bn* in the line circuits are closed. Thus, relays F1 to F*n* respectively allotted to the line circuit are in the operated state (—U, *b*1 . . . *bn*, FI1 . . . FI1*n*, FII1 . . . FII*n*, *f*11 . . . *fn*1, earth). Via second contacts *f*12 to *fn*2 of these relays, and via contact *fb*1, a relay FB is energised (—U, *b*1 . . . *bn*, G11 . . . G*n*1, FB, *fb*1, *f*12 . . . *fn*2, earth). Via a second contact *fb*2 of the relay FB, a relay FW in the central control device ZS*t* is energised, via whose contact *fw* a signal indicating that unseized line circuits are available is transmitted to an output TA. As long as this signal is present, outgoing calls can be switched through to free line circuits.

If a line circuit, e.g. U*e*1, is now seized, then with opening of the seizing contact *b*1, the relay F1 allotted to this line ciruit is deenergised. Via its first contact *f*11, the holding circuit for the second winding FII1 of the relay F1 is broken. The relay F1 cannot be operated again as long as other line circuits in the group are free, since the contact *fw* prevents any energising circuit being closed either for the relay F1 or for any of the other F-relays.

As soon as the last line circuit U*en* has been seized, and the last contact *fn*2 has therefore opened, the relay FB drops, and in turn its contact *fb*2, causes the relay FW to drop. At the same time, via the contact *fb*1, the holding circuit for the relay FB is broken, and via a third contact *fb*3, the energising circuit for all the F-relays prepared. If some of the line circuits have meanwhile become free, then via the contact *fw* which applies earth potential to the output FT of the central control device ZS*t*, a relay FG connected to the output can operate. Thus, if before seizing of the last line circuit U*en* the line circuit U*e*1 has become free again, then the relay FG responds in the following circuit: —U, *b*1, G11, FG, G1, FT, *fw*, earth. The relay F1, which is allotted to the first line circuit U*e*1, can now operate via the closed contacts *fb*3 and *fg*1. If, at this time, further line circuits are free, then the associated F-relays can also operate.

In order that line circuits which have meanwhile become free are only readied after the elapse of a specific breakdown monitoring time, the device ZE including the pulse generator ZTG is provided. The pulse generator ZTG has four cam-controlled contacts *n*1 to *n*4. Each cam contact *n*1, *n*2, *n*3, and *n*4 is moved out of the position shown in the drawing after 2000 msec., for a period of 100 msec., i.e. each cam contact applies earth potential for a time of 100 msec., to outputs GL1, GL2, G13, and GL4, at 2000 msec., intervals. The pulses occurring at these outputs are staggered in relation to one another by a specific time i.e. by 500 msec. The chronological sequence of the pulses at the outputs GL1 to GL4 is illustrated in FIG. 2.

The device ZE also includes relays G1 to G4, each allotted to a respective output of the pulse generator ZTG. First windings GI1 to GI4 of these relays are energised via the outputs GL1 to GL4 of the pulse generator ZTG. Via second windings GII1 to GII4, and via first contacts *g*11 to *g*14 of these relays, a holding circuit can be made. In order to explain this in more detail, reference will now be made to FIG. 2. Assuming that the last line circuit to be seized is the line circuit U*en* seized at the time *t*1 (at the end of the timing pulse T11), and that meanwhile the line circuit U*e*1 has become free, at time *t*2, i.e. after 400 msec., the contact *n*2 is operated, and earth potential is thus applied to the output line GL2 for a time of 100 msecs. With seizing of the last line circuit U*en*, a holding circuit for the relay F*b* was broken, and as a consequence of the opening of the contact F*b*2, the relay FW in the central control device ZST caused to drop, relay FG thus operating as a consequence of operation of contact *fw*. The resultant operation of the contact *fg*2 means that with occurrence of the pulse T21 on the line GL2 at the time *t*2, an energising circuit for the relay GI2 is made (—U, *fg*2, GI2, GL2, *n*2, earth). Via its own contact *g*21, and via its second winding GII2, the relay G2 is held Also, the second and third contacts *g*22 and *g*23 of the relay G2 are placed in their make positions. As soon as the cam-controlled contact *n*2 is opened at time *t*3, via the contact *g*23, a further relay GS is energised, and this holds via one of its own contacts *gs*1 (—U, *fg*2, *gs*1, GS, earth). Via a further contact *gs*2 of the relay GS, any energizing of those F-relays whose line circuits have cleared during the breakdown time, is prevented by the opening of the energising circuit. Via a third contact *gs*3, the energizing circuit for the relay FB, which has already been partially prepared via the now operated contact *g*22, is made to such an extent that on occurrence of the next timing pulse on the output line GL2, the relay FB can operate. This happens when the cam-controlled contact *n*2 applies earth potential to the output GL2 at time *t*8. Assuming that, for example, the first line circuit U*e*1 is free, the energising circuit: —U, *b*1, G11, FB, *gs*3, *g*22, GL2, *n*2, earth, is made for the relay FB. Since, in these conditions, the relay F1 has operated, the contact *f*12 being consequently closed, the relay FB holds via its own contacts *fb*1. By means of contact *fb*3, the energising circuit for the F-relay is broken and via the contact *fb*2 the relay FW in the central control device ZS*t* is energized, this in turn causing the relay FG to drop as a consequence of operation of the contact *fw*. With opening of contact *fg*2, the G-relay which has pulled up drops as does the relay GS. All contacts of the relays G1 to G4 and all contacts of the relay GS are now in the position shown in the drawing. During the breakdown monitoring time, the contact *fw* of the central control device ZS*t* prevents any outgoing demands from being handled, and this is indicated in FIG. 1 by the output TA. After the contact *fw* again applies earth potential to the wire TA, the cycle is terminated and the processes are repeated.

Using the system described above, breakdown monitoring times of 1900 msec. to 2400 msecs. are obtained, in accordance with whether the seizing of the last line circuit monitored take place at the beginning or at the end of a timing pulse.

Self evidently, it is possible, by choosing some other time distribution for the timing pulses, to give the monitoring time any desired value.

Further, instead of a cam-controlled pulse generator an electronic pulse generator or other device can be employed to produce the timing pulses.

Systems in accordance with the present invention make it easily possible to allot calls coming from calling subscriber circuits, successively to the corresponding line circuits, so that, for example, the first call goes to the first line circuit U*e*1, the second to the second line circuit U*e*2 etc. To this end, the relays F1 to F*n* respectively allotted to the line circuits have third contacts *f*13 to F*n*3, via which relays FA1 to FA*n* can be energised. If, for example, the first line circuit U*e*1 is seized, then with closure of the contact *f*13, the relay FA1, is energised, and this then connects the first line circuit U*e*1 to the calling subscriber circuit via a marker wire FC1. A second outgoing call can then only energise relay FE2 via the contact *f*23, which in turn connects the second line circuit U*e*2 to the calling subscriber circuit.

The seizing of subscriber circuits in the incoming direction is not affected by this breakdown monitoring system, since the breakdown monitoring time is then established in the distant exchange system.

What I claim as my invention and desire to secure by Letters Patent of the United States is:

1. A system to determine the release supervision for lang distance transmissions in centrally located teleprinter dial exchange installations wherein all the outgoing truck-line circuits associated with a connection are successively made available and a busy signal is produced only after the seizure of all lines, said system comprising:

a group of trunk-line circuits arranged to be successively seized, means for preventing further seizing of said trunk-lines comprising said group, first switching means for sensing the seizing of the last available line of said group and operative responsive thereto to operate said means for preventing, second switching means operative in response to said operation of said first switching means, a pulse generator for periodically providing a plurality of time-spaced synchronizing pulses, each of said pulses being communicated from said pulse generator over one of a plurality of outlets, the number of said outlets corresponding to the number of said synchronizing pulses in a cycle of operation of said pulse generator, a plurality of third switching means, one of which is connected with each said outlets and is operable by the pulses communicated therefrom over the outlet associated therewith and in response to said operation of said first switching means, the one of said third switching means being operated which receives a synchronizing pulse immediately after operation of said first switching means and, fourth switching means operable in response to the cessation of the synchronizing pulse which operates said one third switching means, said fourth switching means including means responsive to the operation thereof for preventing seizure of any of said trunklines which have become free since operation of said first switching means to render said preventing means operative and means for preparing said first switching means to be operative to render said preventing means inoperative upon occurrence of the next synchronizing pulse on the one of said outlets connected to said one third switching means.

2. A system as recited in claim 1 wherein said fourth switching means is adapted to prepare said first switching means for operation to render said preventing means inoperative after one cycle of operation of said pulse generator.

3. A system as recited in claim 1 wherein the synchonizing pulses occurring on one of said outlets are separated by a time corresponding to a predetermined time period during which renewed seizure is to be prevented, and the synchronizing pulses occurring successively on different outlets are separated by a time which is shorter than said predetermined time.

4. A system as recited in claim 1 wherein said third switching means have contacts which form a contact series, by means of which contact series the synchronizing pulse occurring after seizure of the last line circuit in a cycle of operation of said pulse generator operates one of said third switching means.

References Cited

UNITED STATES PATENTS

| | | | |
|---|---|---|---|
| 2,709,718 | 5/1955 | Pharis. | |
| 3,328,531 | 6/1967 | Platt et al. | 179—18.6 |

THOMAS B. HABECKER, Primary Examiner

M. M. CURTIS, Assistant Examiner

U.S. Cl. X.R.

179—18.6